(12) United States Patent
Shen et al.

(10) Patent No.: US 9,123,368 B2
(45) Date of Patent: Sep. 1, 2015

(54) DATA STORAGE DEVICE WITH HGSA OFFSET COMPENSATION

(71) Applicant: Seagate Technology LLC, Cupertino, CA (US)

(72) Inventors: Tzung-Sz Shen, Longmont, CO (US); Chih-Wu Jen, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/066,146

(22) Filed: Oct. 29, 2013

(65) Prior Publication Data

US 2015/0116862 A1 Apr. 30, 2015

(51) Int. Cl.
| | |
|---|---|
| G11B 5/596 | (2006.01) |
| G11B 20/20 | (2006.01) |
| G11B 5/54 | (2006.01) |
| G11B 5/56 | (2006.01) |
| G11B 5/48 | (2006.01) |
| G11B 5/58 | (2006.01) |

(52) U.S. Cl.
CPC ............... *G11B 5/56* (2013.01); *G11B 5/4826* (2013.01); *G11B 5/59627* (2013.01); *G11B 5/58* (2013.01)

(58) Field of Classification Search
None
See application file for complete search history.

(56) References Cited

U.S. PATENT DOCUMENTS

| | | | |
|---|---|---|---|
| 6,201,668 B1 | 3/2001 | Murphy | |
| 7,124,654 B1 | 10/2006 | Davies et al. | |
| 7,283,321 B1 | 10/2007 | Sun et al. | |
| 7,468,869 B2 | 12/2008 | Yao et al. | |
| 7,489,464 B1 * | 2/2009 | McNab et al. | 360/75 |
| 7,580,226 B2 | 8/2009 | Yao et al. | |
| 7,596,859 B2 | 10/2009 | Yao et al. | |
| 7,839,604 B1 * | 11/2010 | Coffey et al. | 360/265.9 |
| 8,687,313 B2 * | 4/2014 | Selvaraj | 360/75 |
| 2007/0247758 A1 * | 10/2007 | Kurita et al. | 360/234.7 |

* cited by examiner

*Primary Examiner* — Andrew L Sniezek
(74) *Attorney, Agent, or Firm* — Hall Estill Attorneys at Law (57) ABSTRACT

A data storage device may be configured at least with an actuating assembly that has a head-gimbal suspension assembly (HGSA), first pivot point, and second pivot point. The head-gimbal assembly can be constructed and operated with at least first and second transducers aligned along a longitudinal axis of the head-gimbal suspension assembly. A controller may be adopted to manipulate the head-gimbal suspension assembly about at least one of the pivot points in response to a head-gimbal suspension assembly offset misalignment to compensate for such an offset.

20 Claims, 5 Drawing Sheets

DATA STORAGE DEVICE WITH HGSA OFFSET COMPENSATION

SUMMARY

Assorted embodiments may configure data storage device with at least an actuating assembly that has a head-gimbal suspension assembly (HGSA), first pivot point, and second pivot point. The HGSA can be constructed and operated with at least first and second transducers aligned along a longitudinal axis of the HGSA. A controller may be adapted to manipulate the HGSA about at least one of the pivot points in response to an HGSA offset misalignment.

DETAILED DESCRIPTION

An increase in data bit areal density on a rotating data storage medium provides increased data capacity but also increased complexity for precisely positioning a data transducing means proximal a selected data bit. While position correction for the actuating assembly may be present in the data storage medium, such correction assumes a single, rigid data transducing means. Such an assumption can produce misalignment between data transducing means and a data bit due to the transducing means being offset as a result of microactuation.

Generally, reader-writer offset depends on the skew angle of a transducing head in relation to a data track. Calibration may be done to compensate for the reader-writer offset, but such calibration is static and does not change when the head is on the same data track. Because a co-located microactuator is positioned near the reading and writing transducers on the transducing head, it can induce an additional skew angle that can degrade system performance. The additional skew angle due to co-located microactuation can cause the writing transducer to be off the intended data track and jeopardize the data in adjacent tracks. This offset can be referred to as dynamic reader-writer offset because it varies from sample to sample depending on the microactuator output when the transducing head is on the same data track.

These issues have rendered a data storage device constructed in accordance with assorted embodiments to have at least an actuating assembly that has a head-gimbal suspension assembly (HGSA), first pivot point, and second pivot point with the HGSA having at least first and second transducers aligned along a longitudinal axis of the HGSA. A controller may be adapted to manipulate the HGSA about at least one of the pivot points in response to an HGSA offset misalignment. The ability to compensate for HGSA offset misalignment allows a dual stage actuating assembly to operate with optimized efficiency despite having the first and second transducer aligned.

With the ability to compensate for measured and predicted offset misalignment with manipulation of the HGSA about a pivot point, compensation can be done in real-time both proactively and retroactively without the need for a position error signal to indicate a misalignment. The adaptive nature of the offset misalignment compensation can further optimize data storage device operating efficiency and accuracy in response to changing operating conditions, such as temperature, humidity, vibration, and structural trauma. As such, data throughput and operational bandwidth can be increased in real-time by compensating for offset misalignment so that transducing means more accurately aligns with selected data bits.

Figure 1:
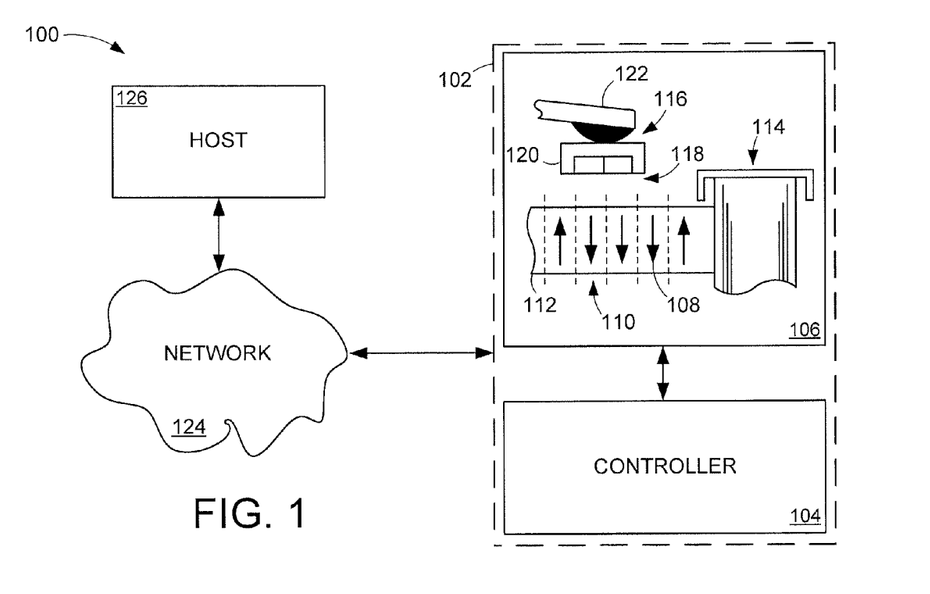
FIG. 1 is a block representation of a portion of an example data storage system configured in accordance with various embodiments.

FIG. 1 generally displays an example data storage system 100 that can employ offset misalignment compensation in accordance with various embodiments. While not required or limiting, the data storage system 100 may have any number of data storage devices 102 that comprise a local controller 104 and a data transducing system 106, such as in a redundant array of independent discs (RAID) or cloud computing environment. The single data transducing system 106 shown in FIG. 1 illustrates how a plurality of magnetic data bits 108 can be arranged in data tracks 110 on a data medium 112 that is controlled by a centrally positioned spindle motor 114.

An actuating assembly 116 can be configured to float a predetermined distance above the data bits 108 and data medium 112 on an air bearing 118 so that at least one transducing head 120 is suspended over selected data bits 108 and tracks 110. In this way, the local controller 104 can dictate data access to and from the data medium 112 by spinning the spindle motor 114 and articulating the actuating arm 122. It should be noted that control of the data transducing assembly 106 is not limited to the local controller 104 as various remote computing components can utilize the transducing assembly 106 across a network 124 via appropriate communications protocol.

The ability to connect any type, function, and number of computing components to the data storage device 102 remotely allows for optimized utilization of the data transducing system 106. For example, a host 126, which may be any number of computing components such as a processor, memory, server, and controller, can operate independently or in conjunction with the local controller 104 to write and read data to and from the data medium 112. In another non-limiting example, the host 126 may provide temporary cache storage for data that is to be stored in the data storage device 102 at a scheduled time, such as a low system processing window or prior to system 100 power down. Through the various system 100 configurations, data storage can be facilitated with increased data capacity and data access speeds.

Figure 2:
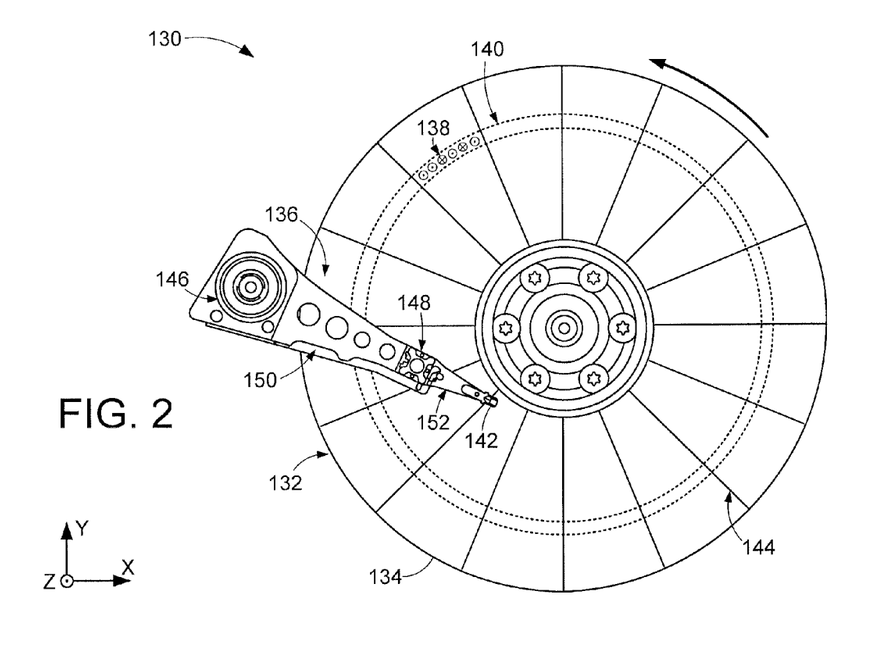
FIG. 2 shows a top view block representation of a portion an example data storage device capable of being used in the data storage system of FIG. 1.

However, the miniaturization of the physical size of the data transducing system 106 can pose operating difficulties that can jeopardize the integrity of stored data and performance of the data storage device 102. FIG. 2 is a top view block representation of a portion of an example data storage device 130 that can experience operational difficulties. As shown, the disk stack portion 132 of the data storage device 130 has at least one recordable medium 134 that is accessed by an actuating assembly 136 to access data bits 138 that are resident in predetermined data tracks 140.

With the increase in data bit areal density, the width of a data track 140 along the X-Y plane is reduced, which positions data bits 138 of adjacent data tracks 140 perilously close. Such an increase in data bit density can correspond with increased risk of inadvertent data bit 138 access and erasure as well as increasing the precision necessary for data transducer 142 alignment with a selected data track 140. The incorporation of servo sectors 144 on the data storage medium 134 can provide overhead operational data, like error correction code and position error signals, that can indicate misalignment of the data transducer 142 and a data track 140. The actuating assembly 136 can be configured to interpret the servo sectors 144 to articulate a voice coil motor 146 and microactuator 148 to independently and concurrently translate the actuating arm 150 and head-gimbal suspension assembly (HGSA) 152 and correct for indicated transducer 142 misalignment.

The use of overhead operational data in the servo sectors 144 can allow for transducer 142 misalignment correction, but such correction is retroactive and relies on the transducer 142 passing subsequent servo sectors 144 to further correct or verify alignment. With the data storage medium 134 spinning at several thousand rotations per minute, such misalignment correction can be conducted with negligible degradation of data bit access performance. However, the reduction in data track 140 size in concert with increased data bit 138 areal density has rendered multiple transducing means to be aligned along the longitudinal axis of the actuating assembly 136 in what can be characterized as a co-located HGSA.

Figure 3A:
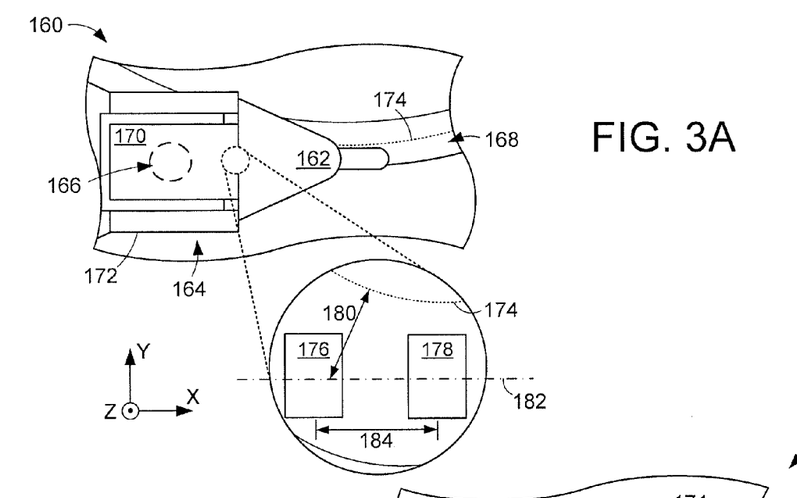
FIGS. 3A and 3B respectively display block representations of portions of an example data storage device configured in accordance with various embodiments.
Figure 3B:
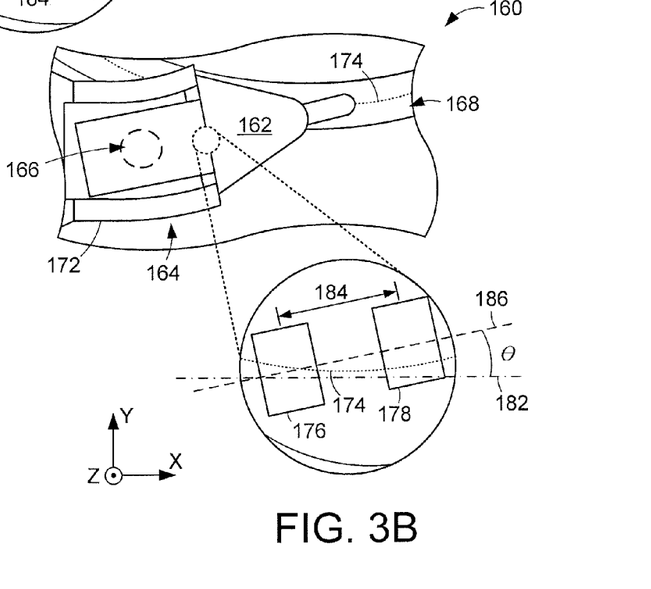

FIGS. 3A and 3B respectively display block representations of an example HGSA portion 160 of a data storage device being operated in different conditions according to assorted embodiments. FIG. 3A illustrates an HGSA 162 connected to a microactuator 164 via a dimple 166 co-located with a transducing head that has at least one data reader 176 and writer 178. The dimple 166 allows the HGSA 162 to pitch and roll on an air bearing to access data bits from a data track 168. It is contemplated that the microactuator 164 can provide a selectively articulable pivot point in an unlimited variety of manners, none of which is required or limiting. In yet, various embodiments configure the microactuator 164 with a slider 170 positioned between piezoelectric elements 172 that can respond to control signals to pivot the HGSA 162 about the dimple 166, as shown in FIG. 3B.

The ability to selectively control the microactuator 164 allows minor misalignment between the HGSA 164 and the centerline 174 to be corrected in real-time to increase the accuracy and performance of data bit accesses from the data track 168. That is, the microactuator 164 can move a data reader 176 and data writer 178 into alignment with the data track centerline 174 to compensate for a track misregistration (TMR) 180. Construction of the HGSA 162 with a co-located microactuator arrangement in which the longitudinal axis 182 bisects both the data reader 176 and writer 178 can allow the HGSA 162 to better compensate the TMR 180 and be able to access data from smaller data tracks 168.

However, FIG. 3B illustrates how microactuation of the co-located HGSA 164 can produce unwanted offset θ as a function of the separation distance 184 between the data reader 176 and writer 178 in combination with the degree of rotation of the HGSA longitudinal axis 186 about the dimple 166. In other words, activation of the co-located microactuator 164 can tilt the HGSA longitudinal axis 186 that bisects both the data reader 176 and writer 178 from alignment along the longitudinal axis 182 of the actuating arm to a new orientation that is offset from the actuating arm longitudinal axis 182 by θ. The ability to articulate the microactuator 164 can provide precise adjustment of the position of the HGSA 162 to the data track centerline 174, as shown in comparison of FIGS. 3A and 3B.

Figure 4:
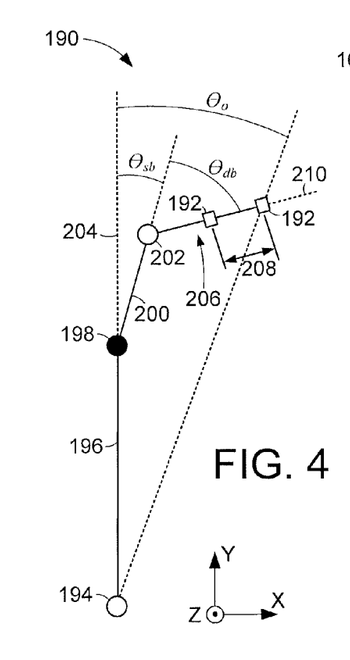
FIG. 4 illustrates a block representation of a portion of an example actuating assembly as constructed and operated in accordance with various embodiments.

However, the precision afforded by the microactuator 164 concurrently produces offset misalignment between the data reader 176 and writer 178 that can position one or more of the transducing means to encroach on adjacent data tracks, which can jeopardize data integrity and data storage device reliability. FIG. 4 provides another block representation of an example HGSA portion 190 of a data storage device that can produce a transducer 192 offset $\theta_o$. It can be appreciated that the actuating assembly portion 190 of illustrated in FIG. 4 has a single line representing various portions of an actuating assembly, such as assembly 136 of FIG. 2, but is in no way limiting to the possible configurations that can be used to position a transducer 192 proximal a selected data bit resident on a rotating data storage medium.

As shown, the actuating assembly portion 190 has a first pivot point 194, which may be a voice coil motor in some embodiments, and an actuating arm 196 that continuously extends from the first pivot point 194 to a suspension pivot point 198. The suspension pivot point 198 is filled in to illustrate that the point is fixed and the angular orientation of the actuating arm 196 and suspension 200 are rigid. Such fixed orientation can have a swaging bias angular offset $\theta_{sb}$ that is predetermined to be part of the actuating assembly or is an inadvertent byproduct of manufacturing and assembly of a data storage device. Regardless of the origin of the swaging bias offset $\theta_{sb}$, the position of the microactuator pivot point 202 is separated from the longitudinal axis 204 of the actuating assembly and can contribute to how much driving bias $\theta_{db}$ is to be applied to properly position a transducer 192 over a selected data bit.

In the event the multiple transducers 192 present on the HGSA 206 have negligible separation distance 208, such as when the transducers 192 are placed symmetrically about the longitudinal axis 210 of the HGSA, each transducer 192 could be plotted by a single location of the HGSA 206 in relation to the first 194, second 198, and third 202 pivot points. However, the read and write transducers 192 are each bisected by the longitudinal axis 210 of the HGSA 206 and separated by a non-negligible distance 208, the respective transducers 192 will be offset, as illustrated in FIG. 4.

Such transducer 192 offset cannot be compensated with position error signals and other servo data from a data storage medium due to the position error signal correcting the data reading transducer's position relative to the medium and not the data writing transducer's position. That is, servo data from a data storage medium is read by a transducer 192 and translated into position correcting information, but the correction of the position of one transducer does not equate to correcting the position of another co-located transducer 192 due to the transducer offset $\theta_o$ as a function of $\theta_{sb}$ and $\theta_{db}$. Therefore, transducer offset can produce HGSA misalignment that can position a transducer 192 outside a selected data track and risk inadvertent data access to data bits from adjacent data tracks, which can be especially problematic in two-dimensional and shingled data storage environments where transducer 192 alignment is paramount to efficient data storage.

Accordingly, transducer 192 offset and the consequential data track misalignment can be computed and compensated by at least a local controller of a data storage device, such as controller 104 of FIG. 1. The controller can proactively and retroactively identify transducer offset and compensate by actively adjusting the microactuation about the microactuator pivot point 202 and factoring the offset into data access requests, such as two-dimensional and shingled data reads and writes, and future position error signals that identify where the HGSA is relative to a data storage medium. Hence, through the identification of the transducer offset, the actuating assembly 190 can be calibrated to compensate for the offset distance as a function of $\theta_{sb}$ and $\theta_{db}$ from the longitudinal axis 204 of the actuating assembly.

Figure 5A:
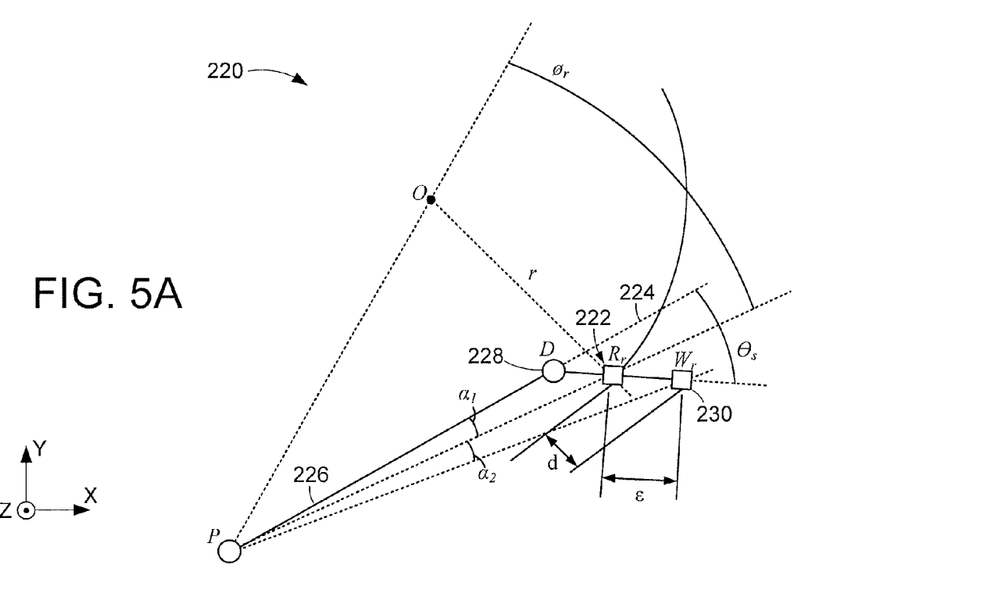
FIGS. 5A and 5B respectively show block representations of an example actuating assembly configured in accordance with assorted embodiments.
Figure 5B:
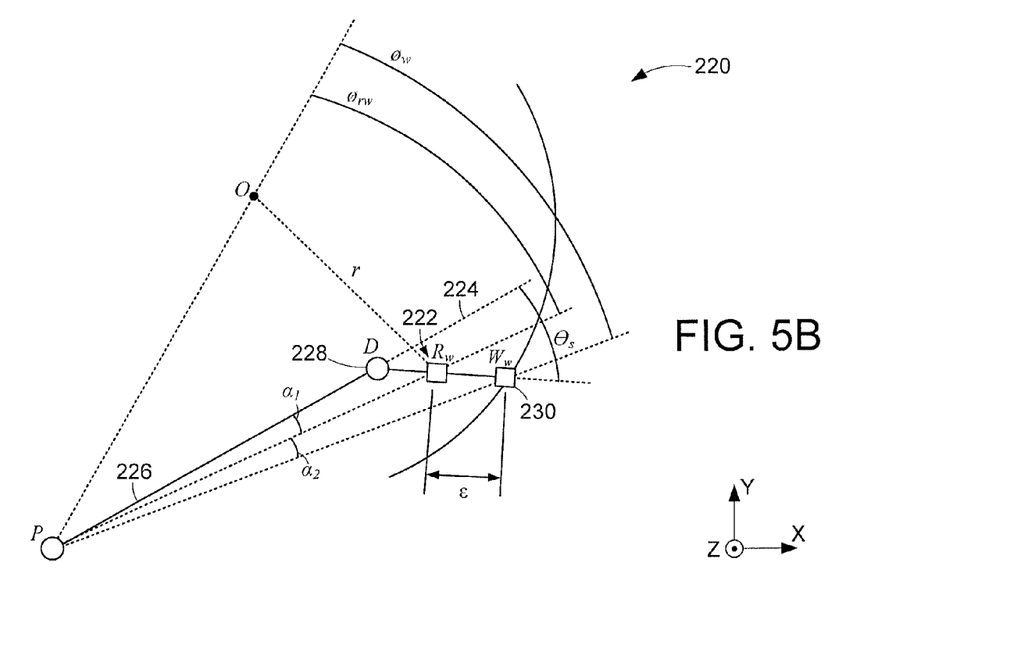

FIGS. 5A and 5B are block representations of an example actuating assembly 220 in operation in accordance with assorted embodiments. FIG. 5A illustrates some of the variables that can be evaluated to compute an offset deviation of a data read transducer 222 from a longitudinal axis 224 of the actuating arm 226. It is contemplated that the position of the read transducer 222 can be sensed by conducting one or more dynamic test patterns where non-user data is written to and subsequently read from a data storage medium. However, various embodiments can statically compute the position of the read transducer 222 and the corresponding offset angle via equation 1:

$$\phi_r = \cos^{-1}\left[\frac{1}{2\overline{PO}\,\overline{R_rP}}\left(\overline{PO}^2 + \overline{R_rP}^2 - r^2\right)\right] \quad \text{(Equation 1)}$$

The offset angle $\phi_r$ can be used in conjunction with the microactuator 228 skew angle $\theta_s$ to understand the relationship of microactuator 228 articulation with read transducer 222 offset. The microactuator 228 skew angle $\theta_s$ can be computed via equation 2:

$$\theta_s = \cos^{-1}\left[\frac{1}{2\overline{DP}\,\overline{RD}}\left(\overline{DP}^2 + \overline{RD}^2 - \overline{R_rP}^2\right)\right] \quad \text{(Equation 2)}$$

With the ability to compute the offset angle $\phi_r$ and microactuator 228 skew angle $\theta_s$, the microactuator 228 can be tuned to proactively compensate for the offset to ensure the read transducer 222 is properly positioned relative the actuating arm 226. It can be appreciated that the farther the read transducer 222 is from the microactuator 228 corresponds to greater HGSA stroke and increased ability to conduct minute microactuator 228 adjustments about pivot point D to position the read transducer 222 over a selected portion of an adjacent data storage medium. Although, the position of the read transducer 222 does not correctly plot the write transducer 230 as additional offset angle is induced by distance $\epsilon$.

FIG. 5B displays how the position of the write transducer 230 can be computed using equations 3, 4, and 5 as follows:

$$\phi_w = \cos^{-1}\left[\frac{1}{2\overline{PO}\,\overline{W_wP}}\left(\overline{PO}^2 + \overline{W_wP}^2 - r^2\right)\right] \quad \text{(Equation 3)}$$

$$\alpha_2 = \cos^{-1}\left[\frac{1}{2\overline{DP}\,\overline{W_wP}}\left(\overline{DP}^2 + \overline{W_wP}^2 - \overline{WD}^2\right)\right] - \alpha_1 \quad \text{(Equation 4)}$$

$$\phi_{rw} = \phi_w - \alpha_2 \quad \text{(Equation 5)}$$

While equations 1-5 can be used individually and collectively to plot the position of the read 222 and write 230 transducers, various embodiments utilize simplified equation 6 to model the offset between the transducers 222 and 230.

$$d = \varepsilon * \cot\left[\cos^{-1}\left(\frac{\overline{W_wP}^2 + r^2 - \overline{PO}^2}{2\overline{W_wP}*r}\right) - \theta_s\right] \quad \text{(Equation 6)}$$

The ability to compute the various constituent geometric aspects of the position of the read 222 and write 230 transducers allows the actuating assembly 220 be dynamically and statically modeled before, during, and after operation that may or may not involve access to an adjacent data storage medium. That is, various test patterns may be conducted with the actuating assembly 220 that allows the position of the read 222 and write 230 transducers to be computed in relation to the microactuator 228, which may be verified by data bit programming and reading operations to a corresponding data storage medium. Such computed transducer position, and specifically the transducer offset for various microactuator 228 bias voltages, may then be tuned with respect to the position of the actuator arm 226 to prevent or correct for transducer misalignment due to the co-located configuration of the microactuator with respect to the transducers about the longitudinal axis 224 of the actuating assembly 220.

Figure 6A:
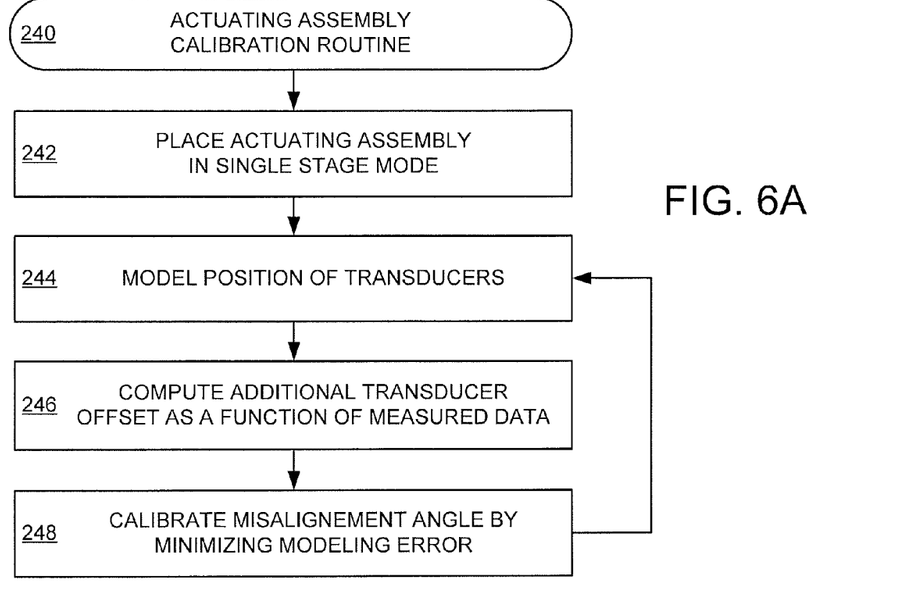
FIGS. 6A and 6B respectively illustrate an example actuating assembly calibration routine and associated example actuating assembly in accordance with various embodiments.
Figure 6B:
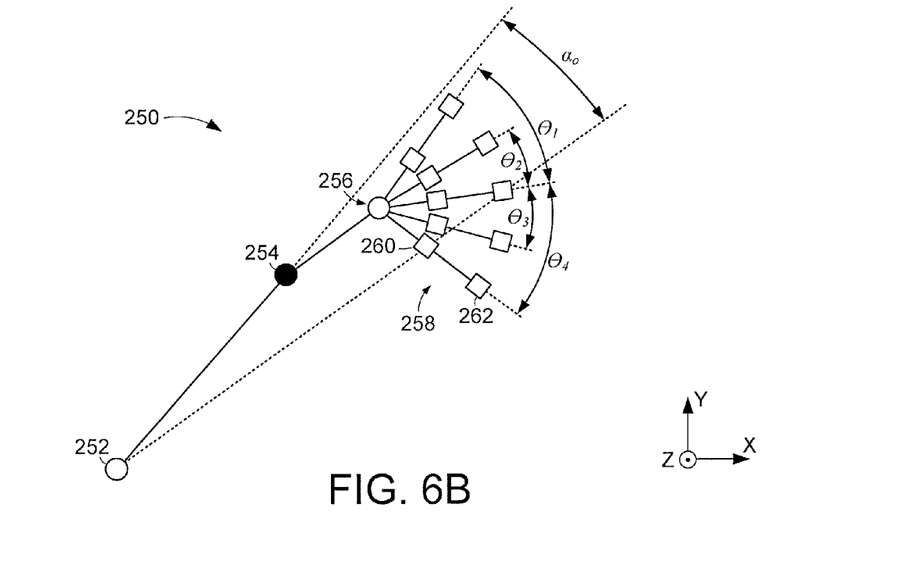

The transducer modeling capabilities provided by equations 1-6 are utilized in assorted embodiments to conduct the actuating assembly calibration routine 240 of FIG. 6A, which is generally represented by the example actuating assembly 250 of FIG. 6B. Step 242 initially places the actuating assembly 250 in a single stage mode in which the microactuator pivot point 256 is fixed and the voice coil motor 146 translates the HGSA 258 to align the reader 260 to a data track. The microactuator pivot point 256 is selectively articulated by a known static voltage to translate the HGSA 258 and induce offset misalignment between the read 260 and write 262 transducers, as illustrated in FIG. 6B.

Next in step 244, routine 240 uses at least one of equations 1-6 to model the position of the respective transducers 260 and 262 for different static microactuator voltages. It should be noted that step 244 can be carried out in an unlimited variety of manners that may, or may not, include using real-time measured data, such as a position error signal and data bit accessing operation, as well as logged data and data predicted by various prediction algorithms. The various positions of the HGSA 258 in FIG. 6B illustrate how step 244 can articulate the microactuator about pivot point 256 with different voltages to induce greater skew angles and differing amounts of transducer offset.

With the position of at least two different HGSA 258 positions due to varying microactuator articulation, step 246 can then use equation 7 to compute any additional transducer offset as a function of actual real-time measured data. That is, at least one real-time measurement, such as microactuator voltage, can be correlated by equation 7 with modeling data from equations 1-7 to provide accurate, actual transducer offset misalignment that can be compensated for efficiently without degrading data storage performance.

$$f(\alpha_o) = \Sigma_{v=V_2}^{v=V_p} \Sigma_{t=t_2}^{t=t_p[\delta\Omega}}[\delta\Omega_M(v,t) - \delta\Omega_m(v,t,\alpha_o)] \quad \text{(Equation 7)}$$

where $\alpha t_0$ is the HGSA misalignment angle, v is voltage applied to the microactuator pivot point 256, t is data track location, $\delta\Omega_M$ is computed from real-time measurement, and $\delta\Omega_m$ is computed from modeling.

Calculation of the transducer misalignment angle for various microactuator voltages then allows 248 to calibrate the HGSA misalignment angle $\alpha_0$ by minimizing the modeling error, which can be conducted in an unlimited variety of manners. In one example, the modeling error is minimized by repeating steps 244 and 246 for an increased number of microactuator voltages and corresponding transducer misalignment angles, as shown by routine 240 returning to step 244 after step 248. However, such return to step 244 is not required as step 248 may minimize the modeling error by evaluating position error signals and bit error rates of the actuating assembly 250 during operation to refine the misalignment data and the precision of the transducer offset predicted from equation 7. The actuating assembly calibration routine 240 of FIG. 6A can also be applied to optimize the assembly process for reducing the swaging bias in the HGSA in accordance with some embodiments.

The HGSA can consist of several parts that correspond with precise tooling to be able to align the parts to the same axis 204. There exists misalignment in HGSA due to swaging bias and microactuator driving signal bias, so the three pivot points 194, 198 and 202 do not perfectly line up with 204. Routine 240 can provide not only a calibration approach of the misalignment angle ($\alpha_0$) to complete the model for the offset estimator 240, but also an in-drive measurement technique to adjust the tooling or assembly process to reduce the misalignment in the HGSA.

As a review, the position of transducers can be predicted using modeling equations 1-6. The predicted position of the transducers can then be tested and correlated to actuating assembly 250 operation by combining real-time measured data with the modeling results. Such combination of real-time measured data with predicted modeling allows for proactive calibration of microactuator articulation to compensate for the co-located configuration of microactuator being located near, but separated from, the transducers along the longitudinal axis of the HGSA.

Figure 7A:
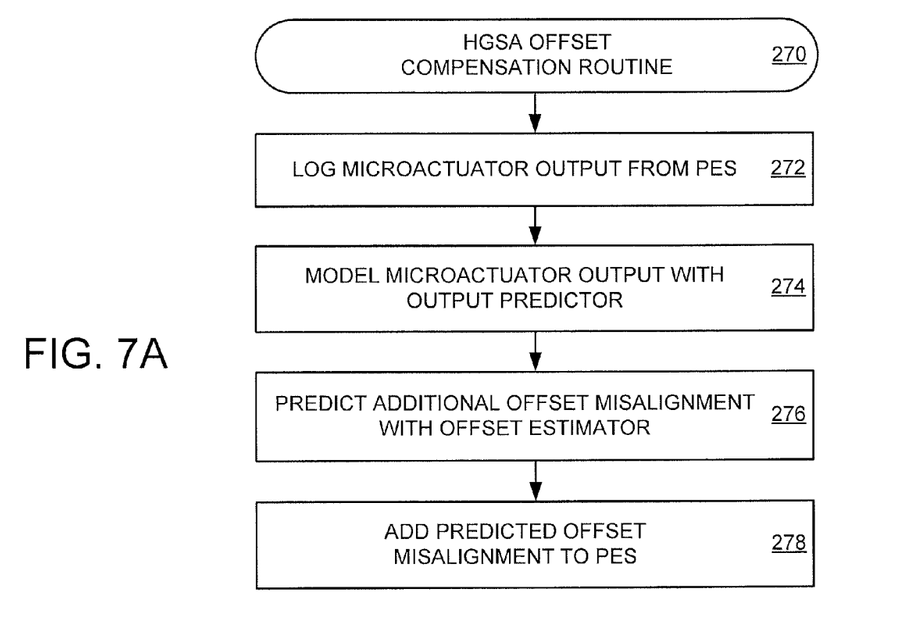
FIGS. 7A and 7B respectively provide an example HGSA offset compensation routine and example prediction circuitry in accordance with various embodiments.
Figure 7B:
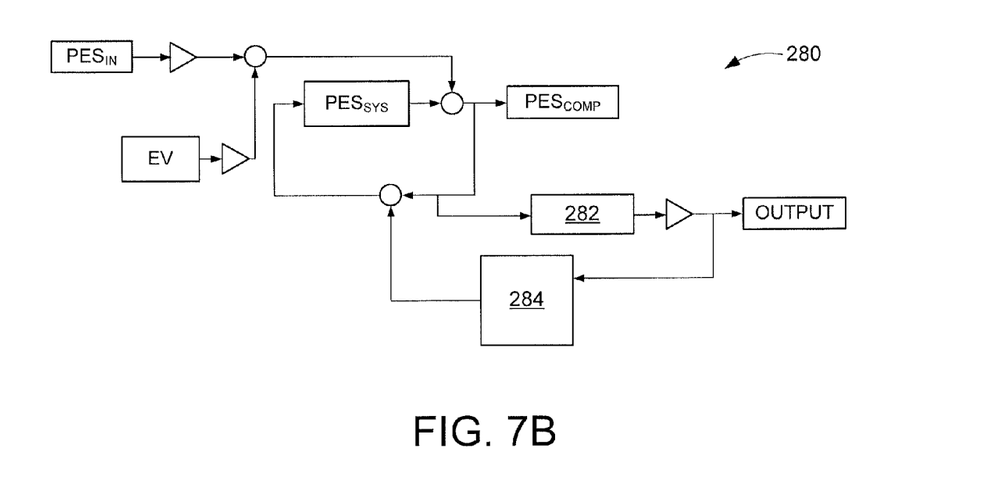

FIGS. 7A and 7B respectively display an example HGSA offset compensation routine 270 that can be carried out in accordance with some embodiments in association with the example prediction circuitry 280 of FIG. 7B. Routine 270 begins by logging microactuator output from position error signals from a corresponding data storage medium in step 272. Step 272 may further involve data bit programming and reading operations along with the passage of the transducers over servo portions of the data storage medium during the servicing of user data commands as an active or passive measurement. The logged microactuator output is not limited to a particular value, but may have at least the microactuator voltage and HGSA skew angle as part of the logged data.

The logged microactuator output can then be predictively modeled in step 274 by the output predictor 282 of FIG. 7B. The output predictor 282 can utilize a transfer function to translate the logged microactuator output into actuating assembly controls dictating such output. That is, the output predictor 282 can utilize logged microactuator data to compute various actuating assembly controls associated with that data, such as voice coil voltage, swaging bias, and HGSA skew angle. With the microactuator output being computed, step 276 can next predict the additional transducer offset misalignment due to the co-located configuration of microactuator and the transducers via an offset estimator 284 portion of the prediction circuitry 280.

Various embodiments configure the offset estimator 284 to utilize a mathematical function, such as a polynomial function, to simplify the transducer position and offset models represented by equations 1-6 and to predict the offset distance between the read and write transducers of the HGSA. The offset estimator may further predict the offset misalignment of the transducers as a function of the microactuator voltage and HGSA skew angle. Subsequently, step 278 of routine 270 adds the predicted transducer offset to position error signals received from the corresponding data storage medium to compensate for the offset misalignment by altering the amount of actuator articulations, such as voice coil voltage and microactuator voltage, called for by the position error signals.

As a non-limiting example of the operation of routine 270 and prediction circuitry 280, the output predictor 282 and offset estimator 284 can predict the amount of transducer offset misalignment for various microactuator skew angles and the resultant compensation can increase or decrease the amount of microactuation or voice coil voltage employed from received position error signals. As such, low microactuator skew angles may not employ offset compensation while high skew angles greatly modify the voltage to the microactuator and the resulting skew angle to ensure both transducers are aligned with a selected data track of a data storage medium.

In some embodiments, routine 270 can be continually conducted while user data is programmed to a data storage medium to dynamically compensate for changes in actuating assembly conditions, such as vibration, microactuator malfunction, and heat. The ability to precisely predict transducer offset misalignment and continually, routinely, and sporadically evolve the computation of the offset misalignment ensures accurate and efficient data storage performance regardless of the environmental and operational variables like co-located transducers and temperature.

It should be noted that while routine 270 and prediction circuitry 280 can be utilized to optimize data storage performance, the various aspects shown in FIGS. 7A and 7B are not required or limiting. Accordingly, any number of steps can be added, omitted, and modified to accommodate the measurement, prediction, calibration, and compensation of transducer offset misalignment. For example, a step may be added to routine 270 that provides the offset misalignment prediction to the position error signals of the corresponding data storage medium as a closed-loop that operates similar to shifting the reference input into the feedback control loop for the actuating assembly. Furthermore, a step may be added that provides the offset misalignment prediction to one or more actuator outputs to compensate the offset by a feed-forward control loop.

Even though data storage media can contain sophisticated high-bandwidth servo control that can precisely position a transducer over a designated data bit, the co-located configuration of microactuator and transducers along a longitudinal axis of the HGSA can produce offset misalignment of transducers on the HGSA that degrades data access performance. While the position error controls of the data storage media can correct a single transducer's position relative to a data storage medium, the compensation of co-located configuration of microactuator and transducers can involve the modeling of the position of various transducing means in relation to various actuating assembly pivot points before calibrating the actuating assembly to combine real-time microactuator measurements with the modeled data. Such combination of model and actual measured data allows transducer offset misalignment to modify a microactuator's or voice coil's response to a position error signal to ensure each transducer is positioned over a selected data track of the data storage medium to optimize data access performance and accuracy.

It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising:
    an actuating assembly comprising a head-gimbal suspension assembly (HGSA) connected to a first pivot point via second and third pivot points, the first and second pivot points connected via an actuating arm, the third pivot point disposed between the first and second pivot points, the third pivot point being fixed and positioning the first pivot point a predetermined, non-zero distance from a longitudinal axis of the HGSA, the HGSA connected to the second pivot point via a suspension and comprising first and second transducers aligned along the longitudinal axis of the HGSA; and
    a controller adapted to manipulate the HGSA about at least one of the pivot points in response to a predicted HGSA offset misalignment between at least one transducer and a centerline of a data track of an adjacent data storage medium.

2. The apparatus of claim 1, wherein the first and second transducers are separated along the longitudinal axis of the HGSA.

3. The apparatus of claim 1, wherein a microactuator is positioned at the first pivot point.

4. The apparatus of claim 3, wherein the microactuator comprises a slider disposed between piezoelectric elements.

5. The apparatus of claim 3, wherein the HGSA connects to the microactuator via a dimple.

6. The apparatus of claim 1, wherein a voice coil motor is positioned at the second pivot point.

7. The apparatus of claim 1, wherein the actuator arm is rigid.

8. The apparatus of claim 7, wherein the longitudinal axis of the HGSA differs from a longitudinal axis of the actuator arm.

9. The apparatus of claim 1, wherein the HGSA offset misalignment comprises the first and second transducers being on different axis in relation to the second pivot point as a function of skew angle about the first pivot point.

10. The apparatus of claim 1, wherein the longitudinal axis of the HGSA bisects the first and second transducers.

11. The apparatus of claim 1, wherein the first and second transducers are separated along the longitudinal axis.

12. A data storage device comprising:
    an actuating assembly comprising a head-gimbal suspension assembly (HGSA) connected to a first pivot point via second and third pivot points, the first and second pivot points connected via an actuating arm, the third pivot point disposed between the first and second pivot points the third pivot point being fixed and positioning the first pivot point a predetermined, non-zero distance from a longitudinal axis of the HGSA, the HGSA connected to the second pivot point via a suspension and comprising first and second transducers aligned along the longitudinal axis of the HGSA; and
    a controller adapted to manipulate the HGSA about at least one of the pivot points in response to an HGSA offset misalignment anticipated by a prediction circuitry, the HGSA offset misalignment measured as a distance between at least one transducer and a centerline of a data track of an adjacent data storage medium.

13. The data storage device of claim 12, wherein the prediction circuitry combines model data and measured microactuator data to anticipate the HGSA offset misalignment.

14. A method for use with an actuating assembly having a head-gimbal suspension assembly (HGSA) connected to a first pivot point via a second pivot point, the first and second pivot points connected via an actuating arm, the HGSA connected to the second pivot point via a suspension and having first and second transducers aligned along a longitudinal axis of the HGSA, the method comprising:
    predicting an HGSA offset misalignment with a prediction circuitry that plots the respective positions of the first and second transducers with different modeling equations, the HGSA offset misalignment measured as a distance between at least one transducer and a centerline of a data track of an adjacent data storage medium; and
    manipulating the HGSA about at least one of the pivot points with a controller in response to the HGSA offset misalignment.

15. The method of claim 14, wherein a position error signal provided by a servo sector of the adjacent data storage medium is refined by the predicted HGSA offset misalignment to dictate the degree of manipulation about the at least one pivot points.

16. The method of claim 15, wherein the predicted HGSA offset misalignment is a function of the voltage applied to a microactuator to produce a skew angle.

17. The method of claim 16, wherein a zero skew angle corresponds with zero HGSA offset misalignment and the HGSA being manipulated about the second pivot point exclusively.

18. The method of claim 14, wherein the prediction circuitry uses a transfer function in combination with measured position error signals from an adjacent data storage medium to model an initial HGSA offset misalignment.

19. The method of claim 18, wherein the prediction circuitry uses a polynomial function to predict additional transducer misalignment that is added to the initial HGSA offset misalignment.

20. The method of claim 14, wherein the HGSA is manipulated to position both transducers proximal a centerline of a data track present on a corresponding data storage medium.

* * * * *